US012346691B2

(12) United States Patent
Meng et al.

(10) Patent No.: US 12,346,691 B2
(45) Date of Patent: Jul. 1, 2025

(54) MODERNIZING APPLICATION COMPONENTS TO REDUCE ENERGY CONSUMPTION

(71) Applicant: INTERNATIONAL BUSINESS MACHINES CORPORATION, Armonk, NY (US)

(72) Inventors: Fan Jing Meng, Beijing (CN); Peng Hui Jiang, Beijing (CN); Cheng Fang Wang, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/809,061

(22) Filed: Jun. 27, 2022

(65) Prior Publication Data

US 2023/0418598 A1 Dec. 28, 2023

(51) Int. Cl.
*G06F 8/77* (2018.01)
(52) U.S. Cl.
CPC ....................... *G06F 8/77* (2013.01)
(58) Field of Classification Search
CPC .................. G06F 8/77; G06F 8/10; G06F 8/75
See application file for complete search history.

(56) References Cited

U.S. PATENT DOCUMENTS 9,998,562 B1 * 6/2018 Peterson ................ H04L 67/60
11,157,267 B1 10/2021 Li
11,429,764 B2 * 8/2022 Hu ....................... G06F 11/3466
2011/0016342 A1 1/2011 Rowan
2012/0174059 A1 * 7/2012 Jaladeen ............... G06F 11/328
717/105
2017/0131996 A1 5/2017 Crosby
2021/0064953 A1 * 3/2021 Exertier .................. G06N 3/10
2021/0286697 A1 * 9/2021 Yang .................. G06F 11/3452
2021/0365354 A1 11/2021 Gilpin (Continued)

FOREIGN PATENT DOCUMENTS

CN 107943505 A 4/2018

OTHER PUBLICATIONS

Brodie, et al., "Migrating Legacy Systems: Gateways, Interfaces, & the Incremental Approach," The Availability Digest [article], Mar. 2007, 7 pages.

(Continued)

*Primary Examiner* — Qing Chen
*Assistant Examiner* — Amir Soltanzadeh
(74) *Attorney, Agent, or Firm* — Elliot J. Shine (57) ABSTRACT

A method, computer system, and a computer program product for application modernization is provided. The present invention may include receiving operation data related to an application. The present invention may include identifying a plurality of entities based on the operation data related to the application. The present invention may include identifying one or more interactions between each of the plurality of entities. The present invention may include determining an energy consumption pattern for the application by analyzing a consumption of energy related to workload. The present invention may include determining a modernization scope for the application based on the energy consumption pattern.

23 Claims, 5 Drawing Sheets

(56) References Cited

U.S. PATENT DOCUMENTS

2023/0183196 A1* 6/2023 Chen .................. C07D 279/06
514/276

OTHER PUBLICATIONS

Chikofsky, et al., "Reverse Engineer and Design Recovery: A Taxonomy," IEEE Software [article], Jan. 1990, pp. 13-17.
Comella-Dorda, et al., "A Survey of Black-Box Modernization Approaches for Information Systems," Proceedings 2000 International Conference on Software Maintenance, Oct. 2000, pp. 173-183, Retrieved from the Internet: <URL: https://ieeexplore.ieee.org/document/883039?arnumber-883039>.
Mell, et al., "The NIST Definition of Cloud Computing", National Institute of Standards and Technology, Special Publication 800-145, Sep. 2011, 7 pages.
Shah, "Drive Digital Transformation by Deciphering Legacy Applications," TCS Tata Consultancy Services [blog], Sep. 8, 2021 [accessed on May 23, 2022], 5 pages, Retrieved from the Internet: <URL: https://www.tcs.com/blogs/code-analysis-enterprise-digital-transformation>.

* cited by examiner

MODERNIZING APPLICATION COMPONENTS TO REDUCE ENERGY CONSUMPTION

BACKGROUND

The present invention relates generally to the field of computing, and more particularly to application modernization.

An application component may be defined as a modular, deployable, and/or replaceable part of a software system that encapsulates the component's behavior and/or data and makes the component available through a set of interfaces. An application component may be a self-contained unit of functionality that performs one or more application functions. Cooperating application components may be application components which may be connected via application collaborations. An application component may be assigned to one or more application functions, business processes, and/or business functions.

Enterprise application modernization may be useful for new requirements, capabilities, architecture, programming models, and/or environmental considerations. However, due to at least technical complexity, knowledge gaps, and/or lack of key resources, modernization of enterprise applications may be difficult.

SUMMARY

Embodiments of the present invention disclose a method, computer system, and a computer program product for application modernization. The present invention may include receiving operation data related to an application. The present invention may include identifying a plurality of entities based on the operation data related to the application. The present invention may include identifying one or more interactions between each of the plurality of entities. The present invention may include determining an energy consumption pattern for the application by analyzing a consumption of energy related to workload. The present invention may include determining a modernization scope for the application based on the energy consumption pattern.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for application modernization. As such, the present embodiment has the capacity to improve the technical field of application modernization by discovering and analyzing application components to be modernized and/or reduce energy consumption. More specifically, the present invention may include receiving operation data related to an application. The present invention may include identifying a plurality of entities based on the operation data related to the application. The present invention may include identifying one or more interactions between each of the plurality of entities. The present invention may include determining an energy consumption pattern for the application by analyzing a consumption of energy related to workload. The present invention may include determining a modernization scope for the application based on the energy consumption pattern.

As described previously, an application component may be defined as a modular, deployable, and/or replaceable part of a software system that encapsulates the component's behavior and/or data and makes the component available through a set of interfaces. An application component may be a self-contained unit of functionality that performs one or more application functions. Cooperating application components may be application components which may be connected via application collaborations. An application component may be assigned to one or more application functions, business processes, and/or business functions.

Enterprise application modernization may be useful for new requirements, capabilities, architecture, programming models, and/or environmental considerations. However, due to at least technical complexity, knowledge gaps, and/or lack of key resources, modernization of enterprise applications may be difficult.

Therefore, it may be advantageous to, among other things, receive operation data related to an application, identify a plurality of entities based on the operation data related to the application, identify one or more interactions between each of the plurality of entities, determine an energy consumption pattern for the application by analyzing a consumption of energy related to workload, and determine a modernization scope for the application based on the energy consumption pattern.

According to at least one embodiment, the present invention may improve component identification by utilizing operation data such as, but not limited to, operational logs, monitoring data, trace data, amongst other operational data for the application as opposed to the current approaches which utilize a document-based approach and/or a static code analysis approach. The document-based approach may be design document and/or interview document based which may be highly dependent on quality of documentation and/or skills/knowledge of interviewees. The static code analysis approach may only address static interactions of components which may make it difficult to identify dynamic binding interactions, which may not be possible for applications without code and may be programming language specific such that it may not apply to multiple coding languages.

According to at least one embodiment, the present invention may improve sustainability by identifying resource utilization patterns and defining modernization scopes by analyzing workload behavior and/or discovering workload access, process, and/or behavior patterns.

According to at least one embodiment, the present invention may improve the sustainability and/or modernization of applications by discovering energy consumption patterns based on an analysis of energy consumption related to workload using component, chronological, and/or geographical granularity.

According to at least one embodiment, the present invention may improve the accuracy and/or identification of both components of an application and the interactions between those components specifically for those applications without code and/or applying dynamic/late binding.

According to at least one embodiment, the present invention may improve the visualization and/or modernization scope of application components by composing a graph based on discovered entities and their interactions and extracting graph features based on at least those properties.

According to at least one embodiment, the present invention may improve application modernization by utilizing operation data related to an application which may be especially useful in enterprise applications due to at least, tech complexity, knowledge gaps, lack of key resources, amongst other reasons. Tech complexity may include, but is not limited to including, programming models, application framework, interactions and/or dependencies, complicated configurations, amongst other tech complexities. Knowledge gaps may include, but are not limited to including, lack of skills applicable to older components, evolution of programming languages, knowledge of application components, amongst other knowledge gaps. Lack of key resources may include, but are not limited to including, lack of source code, lack of documentation, lack of small and mid-size enterprises, amongst other key resources.

Figure 1:
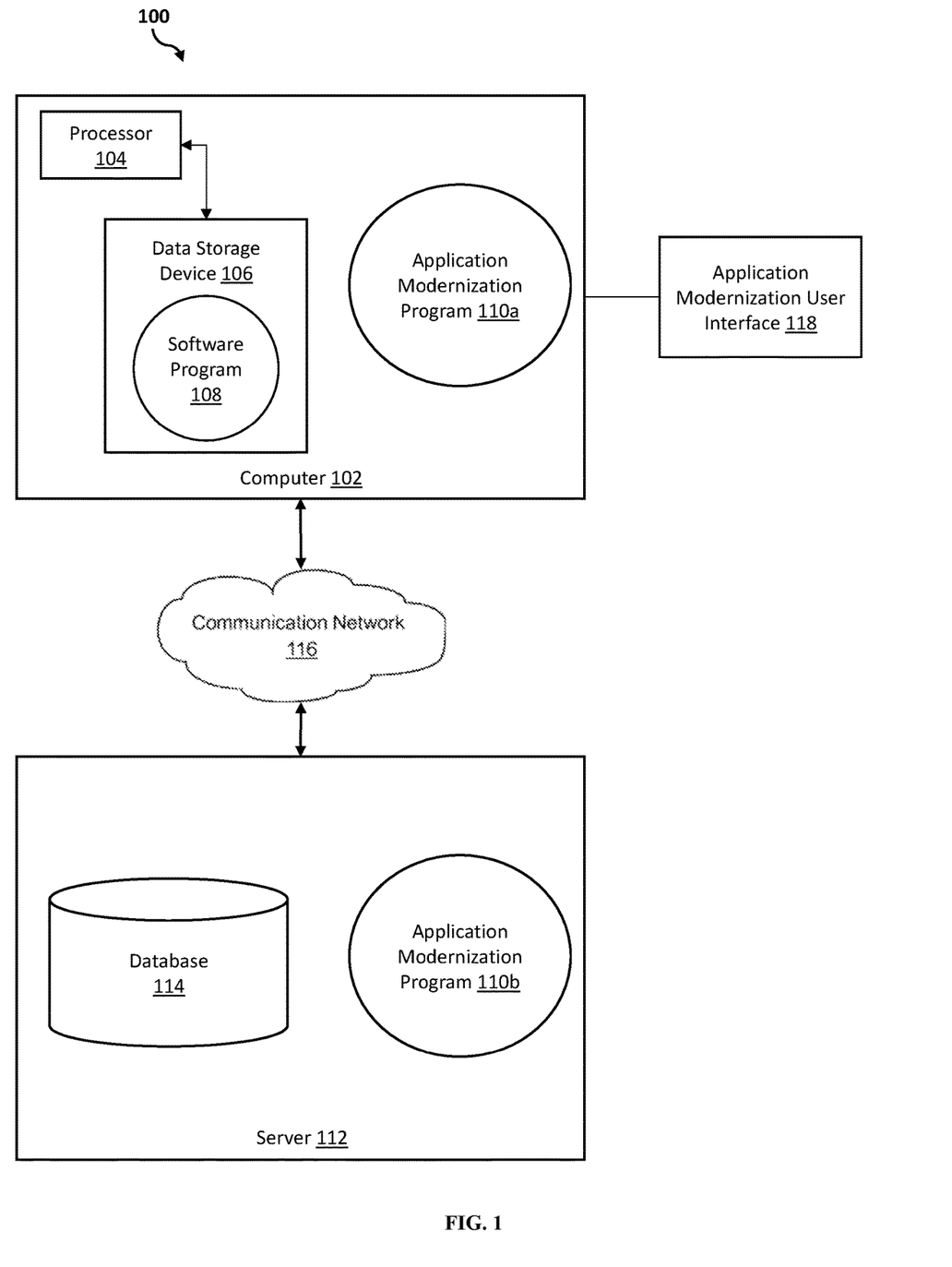
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an application modernization program 110a. The networked computer environment 100 may also include a server 112 that is enabled to run an application modernization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the application modernization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the application modernization program 110a, 110b (respectively) to discover and analyze application components to be modernized and/or reduce energy consumption. The application modernization method is explained in more detail below with respect to FIG. 2.

Figure 2:
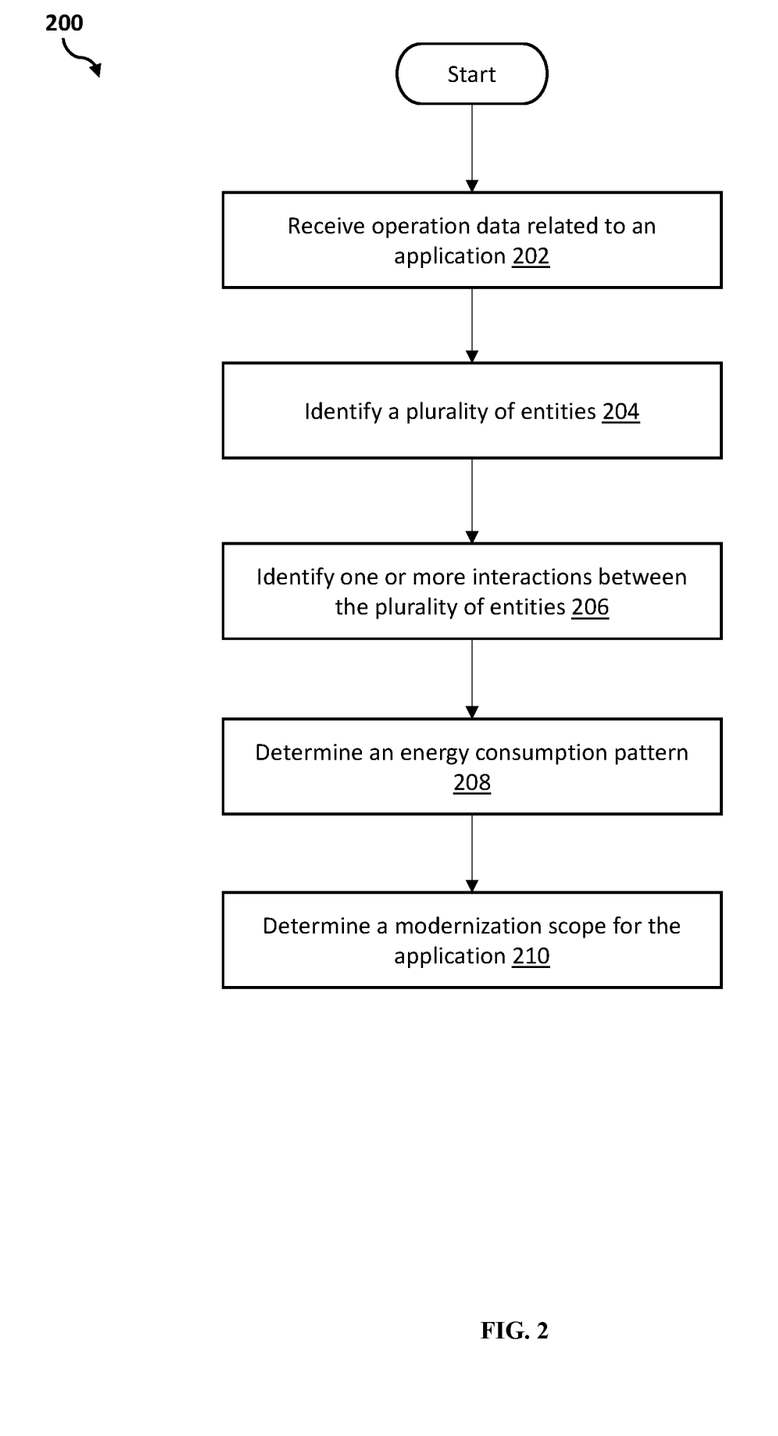
FIG. 2 is an operational flowchart illustrating a process for application modernization according to at least one embodiment.

Referring now to FIG. 2, an operational flowchart illustrating the exemplary application modernization process 200 used by the application modernization program 110a and 110b according to at least one embodiment is depicted.

At 202, the application modernization program 110 may receive operation data related to an application. The application modernization program 110 may receive operation data such as, but not limited to, operational logs, monitoring data, trace data, business process event logs, database logs, system logs, transaction logs, system management facility (SMF) logs, amongst other operational data related to the application and/or the application's related environments (e.g., middleware, operating systems). The operation data may include time-stamped process event logs produced by the execution of one or more processes by the application which may include informative data related to the execution of the one or more processes. The application may be comprised of a plurality of components, with one or more of the plurality of components interacting with each other and/or being connected via application collaborations. The plurality of components may include, but are not limited to including, a module, data structure, a service, amongst other parts of the application. The application for which the operation data may be received may include, but is not limited to including, mainframe applications, 3-tier applications, micro-service applications, batch applications, IoT (Internet of Things) applications, mobile applications, Enterprise applications, amongst other applications and/or combinations of individual applications as part of a computing system. Enterprise applications may include, but are not limited to including, enterprise systems, supply chain management systems, customer relationship management systems, knowledge based systems, amongst other systems which may span multiple functional areas, may execute business processes across an enterprise, and may include one or more levels of management across an enterprise.

The application modernization program 110 may be configured to receive operation data from the application directly. The application modernization program 110 may receive the operation data related to the application in real time. The application modernization program 110 may perform one or more pre-processing functions on the operation data received for the application, such as, but not limited to, formatting the operation data to a common format. The operation data may be stored in a knowledge corpus (e.g., database 114). As will be explained in more detail below, the knowledge corpus (e.g., database 114) may store known patterns and/or monitoring data associated with identified application entities and/or components.

At 204, the application modernization program 110 identifies a plurality of entities. The plurality of entities may include any identical objects identified from the operation data, which may include, but is not limited to including, the plurality of components comprising the application, servers, interfaces, services, virtual memory systems (VMS), performance optimized data centers (PODs), amongst other components which may comprise the application.

The application modernization program 110 may identify the plurality of entities by constructing a key-value set. The key-value set may include a distribution of appearances within the operation data that may indicate the use of an entity specific to the application. For example, the key-value set may include a list of entities such as thread entities, container entities, transaction entities, service entities, requests, amongst other entities which may be specific to the application. The distribution of appearances within the operation data may include, but is not limited to including, a number of requests for a given request identifier, the size of requests for a given request identifier, the number of requests for a given user identifier, amongst other distributions of appearance. As will be explained in more detail below, the application modernization program 110 may construct the key-value set utilizing one or more data analysis techniques. The one or more data analysis techniques may include, but are not limited to including, parsing unstructured log data, pattern matching, data profiling, and/or rule-based matching.

The application modernization program 110 may construct the key-value set from at least the operation data received by the application modernization program 110 at step 202. The application modernization program 110 may construct the key-value set by splitting and/or parsing unstructured log data into attributes and/or key-value pairs. The application modernization program 110 may split and/or parse the operation data received at step 202 utilizing schema-based parsing amongst other parsing techniques to transform the operation data into the key-value set which may be in one or more common formats, such as, but not limited to, JSON format. For example, a line of an HTTP access log may be parsed based on a common HTTP access log schema. The application modernization program 110 may count the number of times the line of the HTTP access log appears in the operational data which may utilized in determining the distribution of appearances. As will be explained in more detail below, if the distribution meets a selected criteria based on pattern matching, data profiling, and/or rule-based matching the entity associated with the distribution will be stored in the key-value set (e.g., identified by the application modernization program 110). The selected criteria may be a predetermined threshold for the number of requests and/or request size. For example, a distribution with a low number of requests and/or large fluctuated distribution may not be stored in the key-value set and/or identified by the application modernization program 110.

The application modernization program 110 may also utilize pattern matching and/or data profiling in identifying key entities, attributes, and/or relations from the key-value set based on the operation data. Pattern matching may include identifying patterns of values in identifiers, such as, but not limited to, Internet Protocol addresses, URL addresses, HTTP access logs, amongst other unique identifiers which may be determined utilizing the parsing techniques described above. The application modernization program 110 may utilize pattern matching to identify patterns of values in the identifiers using patterns associated for known application entities stored in the knowledge corpus (e.g., database 114). Furthermore, based on the identified patterns of values the application modernization program 110 may utilize data profiling in determining the distribution of appearances in the operation data. The distribution of appearances may enable the application modernization program 110 to profile the utilization of each entity. For example, data profiling may include identifying a number of requests for given request identifier, wherein the distribution represents the size of the requests for a given request identifier and the distribution may show the number of requests for a given identifier. The data profiling of the entities may enable the application modernization program 110 classify each of the one or more entities according to at least, key entities, entity attributes, and/or other relations. The classifications may be stored in the knowledge corpus (e.g., database 114) and/or utilized in constructing the key value set.

The knowledge corpus (e.g., database 114) may be utilized by the application modernization program 110 for at least rule-based matching, wherein the rule-based matching may be defined based on a set of pre-defined rules for one or more known entities. For example, a predefined rule may be represented by a regular expression to identify a potential host entity based on an Internet Protocol (IP) address. The application modernization program 110 may compare patterns of values for the IP address with typical patterns and/or expected values stored in the knowledge corpus (e.g., database 114) for an associated entity. The application modernization program 110 may store the entity associated with the patterns of the IP address in the key-value set if those patterns may be considered within a threshold of the typical patterns expected based on the set of pre-defined rules. The application modernization program 110 may also utilize data profiling and/or classification in identifying the one or more entities based on each key-value pair.

The application modernization program 110 may deduplicate the one or more entities based on a similarity of a value domain for the key entities and/or filter the application components based on one or more monitoring labels, the one or more monitoring labels may be attributes attached to monitoring data. For example, monitoring data related to a Central Processing Unit (CPU) utilization metric, may include metrics such as timestamps and/or utilization values, as well as host name, IP address, amongst other data.

At 206, the application modernization program 110 identifies one or more interactions between each of the plurality of entities. The application modernization program 110 may identify interactions, such as, but not limited to, correlated entities, composited entities, aggregated entities, and/or dependent entities between each of the entities identified from the operation data. As will be explained in more detail below, the application modernization program 110 may utilize the operational logs in performing a data profiling of each of the plurality of entities and identify field relationships between each of the entities which may be utilized by the application modernization program 110 in identifying the interactions between each of the entities for fields in the same operational logs and/or fields in different operational logs.

The application modernization program 110 may utilize a co-occurrence degree in identifying entities correlated with one or more other entities. The co-occurrence degree of entities may be a frequency in which a pair of entities occur within the same operational log. The application modernization program 110 may determine utilization fields from which coexisting entities may have been identified in the same operational log lines of operation data in determining a co-occurrence degree between each of the one or more entities. The application modernization program 110 may use the utilization fields in performing a correlation analysis between each of the entities by applying one or more association rules and/or computing co-occurrence probabilities between each pair of entities. The co-occurrence degree between each of the one or more entities may be stored in the knowledge corpus (e.g., database 114).

The application modernization program 110 may also utilize fields in different operational logs of operation data in determining interactions between each of the one or more entities identified at step 204. The application modernization program 110 may utilize the fields in different operational logs in identifying interactions, such as, but not limited to, composited entities, aggregated entities, and/or dependent entities. The application modernization program 110 may utilize one or more field value mapping and/or life-cycle assessment techniques in identifying the composited entities and/or aggregated entities, wherein a life-cycle assessment may be one or more methodologies for assessing an environmental impact associated with one or more stages of a life cycle of a commercial product, process, and/or service. The composited entities identified may share the same value domains and/or life-cycle with their composited entities without any exclusion. The aggregated entities may share the same value domains but not the same life-cycle with their aggregated entities. The composited entities and/or aggregated entities interactions identified by the application modernization program 110 may be stored in the knowledge corpus (e.g., database 114). The application modernization program 110 may utilize one or more sequence mining techniques in identifying dependent entities for the plurality of entities identified at step 204. The dependency between each of the plurality of entities identified at step 202 may be stored in the knowledge corpus (e.g., database 114).

The application modernization program 110 may integrate monitoring metrics with the plurality of entities identified at step 204 and/or the plurality of interactions between each of the plurality of entities identified at step 206 utilizing at least historical monitoring metrics in building a metrics model. Historical monitoring metrics may be time-series data collected and/or received by the application modernization program 110 for a monitored environment of the application, such as a response time for an application component and/or CPU, memory, and/or disk space utilization of a server. For example, the application modernization program 110 may utilize a regression model for a single time-series monitoring metric and/or a clustering model for monitoring data with two or more time-series in building the metrics model based on the historical monitoring metrics.

The metrics model may be utilized by the application modernization program 110 in determining workload patterns for the application. The workload patterns for the application may reveal at least how a workload may be accessed and how a given workload may behave which may impact the way to design, deploy, and/or manage a workload. As will be explained in more detail below with respect to step 208 the workload patterns may be utilized in at least identifying an energy consumption pattern and/or analyzing the consumption of energy related to workload. The application modernization program 110 may discover workload pattern types, the workload pattern types may include at least workload access patterns and/or a workload behavior patterns. The application modernization program 110 may discover both transactional workload access patterns and/or batch workload access patterns for each the plurality of entities based on extracted access features. The extracted access features may include, but are not limited to including, call numbers, frequency numbers, and/or latency. The application modernization program 110 may classify and/or cluster the workload access patterns based on the extracted access features. The application modernization program 110 may utilize one or more classification techniques in classifying the workload access patterns based on the extracted access features. The one or more classification techniques may include, but are not limited to including, k-nearest neighbors (KNN), Support Vector Machine (SVM), a Back Propagation Neural Network (BPNN), a Convolutional Neural Network (CNN), and/or XGBoost, amongst other classification techniques. The application modernization program 110 may utilize one or more clustering techniques such as, but not limited to, hierarchal clustering and/or k-means clustering in clustering the workload access patterns based on the extracted access features. The application modernization program 110 may discover workload behavior patterns for computing performance, Input/Output (IO) performance, memory performance, and/or hybrid resource intensive mode of the application by extracting the resource monitoring metrics and dynamic interactions for each of the plurality of entities with each of the other entities. As will be explained in more detail below, workload access patterns may be leveraged by the application modernization program 110 in identifying the energy consumption patterns of the application.

At 208, the application modernization program 110 determines an energy consumption pattern. The application modernization program 110 may determine the energy consumption pattern of the application by analyzing a consumption of energy related to workload. The energy consumption patterns may be utilized in understanding at least how energy is used and how energy consumption may change over time for the application in which the application modernization program 110 received the operation data at step 202.

The application modernization program 110 may analyze the consumption of energy related to workload using at least component consumption, chronological consumption, and/or geographical consumption, amongst other energy consumption patterns. For example, the consumption of energy in cloud based applications may include at least computing resources, transfer resources, storage resources, amongst other resources which may contribute to the consumption of energy for a given workload. In this example, the component consumption pattern analyzed by the application modernization program 110 may be based on fine-grained statistics for resources in the cloud based application which may be measured and/or modeled to establish a foundation as to how the resources of the cloud based application may be consumed. The chronological consumption may relate to energy consumption which may vary over time. The application modernization program 110 may collect and analyze the chronological consumption over time which may enable the application modernization program 110 to determine an optimal consumption of energy for a given workload, which will be explained in more detail below. The geographical consumption may depend on at least a location of a given resource. The application modernization program 110 may utilize the geographical consumption in determining where to allocate the application workload based on the pre-evaluated consumption of energy. As will be explained in more detail below, the application modernization program 110 may allocate the application workload to at least a core data center, edge nodes, and/or a mix of various locations.

As will be explained in more detail below, discovering energy consumption patterns may be independent from graph construction. The application modernization program 110 may identify the entities and the one or more interactions between each of entities and leverage these identifications in determining the energy consumption patterns of each of the entities. The application modernization 110 may integrate these energy consumption patterns into the constructed graph as described below.

At 210, the application modernization program 110 determines a modernization scope for the application. The application modernization program 110 may determine the modernization scope for the application utilizing a graph constructed based on the one or more entities identified at step 204 and the one or more interactions between those entities identified at step 206. The graph constructed by the application modernization program 110 may be any data structure and/or representation which may illustrate dynamic dependencies of entities, such as, but not limited to, a topology map and/or relational map.

The application modernization program 110 may construct the graph utilizing nodes to represent the one or more components identified based on the operation data and edges between those one or more nodes to represent the interactions between each of the one or more entities. The graph constructed by the application modernization program 110 may be a data structure and/or representation which may show the dynamic dependences between the one or more entities identified at step 204. For example, the application modernization program 110 may construct a temporal operation graph configured as a topology graph and/or relation graph according to steps 202-208. In this example, the operation data may be analyzed to identify the plurality of entities and their interactions (e.g., relationships, interdependencies, properties). These interactions may be plotted in the graph by which entities may be plotted as nodes and the interactions between entities may be plotted as lines and/or edges between the plurality of entities. In this example, the graph may represent all of the plurality of entities identified from the operational data and their interactions (e.g., relationships, interdependencies, properties). In another example, as will be explained in more detail below, the application modernization may construct a graph which represents only a subset of the plurality of entities.

The application modernization program 110 may extract graph features based on the properties included within the graph, the properties may include, but are not limited to including, a number of occurrences, a number of co-occurrences, a number of in-degrees, a number of out-degrees, temporal relations, spatial relations, interdependencies between the one or more entities, correlations between components and/or entities, amongst other properties which may be depicted within the graph constructed by the application modernization program 110. The application modernization program 110 may also utilize the metrics model described at step 206 in integrating the determined workload patterns for the application into the graph which may include at least statistical information which may be utilized by the application modernization program 110 in enriching the graph by providing at least time-dependent characteristics and/or temporal behavior of the one or more entities. The workload patterns utilized by the application modernization program 110 in enriching the graph may illustrate changes in the one or more entities and/or operations of the one or more entities. For example, the graph may illustrate at least usage metrics, interaction frequencies and/or number of interactions between each of the one or more entities.

The application modernization program 110 may display the graph to a user in an application modernization user interface 118. The application modernization user interface 118 may be displayed by the application modernization program 110 in at least an internet browser, dedicated software application, and/or as an integration with a third party software application. The application modernization user interface may enable the user to select components within the graph and display the properties of the component represented by the selected node to the user. The application modernization program 110 may utilize at least the graph and/or data stored in the knowledge corpus (e.g., database 114) in determining and/or displaying statistical attributes corresponding to each of the one or more entities based on the user selections in the application modernization user interface 118. The application modernization program 110 may utilize the graph to display to the user one or more hotspots of energy consumption for the application. The application modernization program 110 may utilize one or more unique colors, numbers, flags, and/or other visual representations in displaying the one or more hotspots of energy consumption for the application to the user. The application modernization program 110 may utilize the visual representations with respect to at least the plurality of nodes comprising the graph and/or the edges between the plurality of nodes. The application modernization program 110 may also construct one or more graphs which may represent one or more subsets of the plurality of entities. The application modernization program 110 may construct the one or more graphs representing one or more subsets of the plurality of entities automatically based on at least, combinations of individual applications as part of a computing system, two or more services, two or more business processes, amongst other application subsets. The application modernization program 110 may also construct one or more graphs representing one or more subsets of entities based on selections made by the user in the application modernization user interface 118 and/or user preferences.

In an embodiment, the application modernization program 110 may also construct one or more graphs specific to energy consumption patterns. The one or more graphs specific to energy consumption patterns may include but are not limited to including, component consumption graphs, chronological consumption graphs, and/or geographical consumption graphs. For example, in this embodiment the application modernization program 110 may construct a component consumption graph using a pie graph. The graph may include the percentages of energy consumption for the application by devices, networks, data centers, and manufacturing. In this example, the user may be able to select devices and the application modernization program 110 may display a further breakdown of the energy consumption associated with each component such as a monitor and desktop. In this example, the application modernization program 110 may further breakdown the energy consumption of the desktop by power supply, graphics cards, motherboard, CPU, hard disk, fans, memory, optical drive, amongst other components.

In another example, the application modernization program 110 may construct a chronological consumption and geographical consumption graph. In this example, an organization may operate throughout a geographic region throughout the year. The application modernization program 110 may construct a chronological consumption graph for each area of a geographic region which may plot the energy consumption patterns throughout the year. The application modernization program 110 may utilize a heat map for the geographical consumption graph based on the chronological consumption graph for each region such that the user may select an area within the geographic region and the application modernization program 110 may retrieve and display the corresponding chronological consumption graph. This may enable the user to evaluate where to allocate workload to either a core data center and/or to edge nodes and mixed locations based on region and associated energy consumption patterns.

The application modernization program 110 may update each graph constructed in real time as additional operational data is received and/or periodically based on a time period set by the user in the user preferences. As described in detail above, the application modernization program 110 may utilize one or more visual representations in displaying hotspots of energy consumption. The hotspots of energy consumption may be based on differences in energy consumption as compared to historical operation data and/or energy consumption patterns stored in the knowledge corpus (e.g., database 114) for a given entity. The differences in energy consumption which may be considered a hotspot and/or flagged in the application modernization user interface 118 using one or more visual representations may be a predetermined threshold and/or one or more standard deviations above or below the norm, which may be further specified by the user in the user preferences. The user may also select the one or more visual representations and/or notification settings for the hotspots in the application modernization user interface 118. Over time as the application modernization program 110 receives operational data, identifies hotspots, and/or monitors energy consumption patterns the application modernization program 110 may utilize data stored in the knowledge corpus (e.g., database 114) in providing one or more recommendations to the user with respect to at least energy efficiency. For example, the application modernization program 110 may identify a hotspot between two entities for a given transactional log based on the edge between those two entities for a specific business process. In this example, the application modernization may provide a recommendation to the user which may enable the user to streamline the business process and/or recommend the replacement of an application component identified as energy inefficient. The application modernization program 110 may monitor the energy consumption patters before and after the one or more recommendations are implemented by the user and store the energy efficiency improvement metrics in the knowledge corpus (e.g., database 114).

In an embodiment, the application modernization program 110 may also utilize one or more pattern mining algorithms in identifying one or more patterns within the graph which may be utilized to extract typical behaviors of the one or more entities comprising the application. In this embodiment, the application modernization program 110 may utilize these extracted behaviors in constructing a model of the application. The model of the application may include, but is not limited to including, descriptions of each of the one or more entities, interactions and/or dependencies between each of the one or more entities, and/or the behavioral characteristics of each of the one or more entities. The model of the application may be utilized by the user in simulating the energy consumption patterns for sample operational logs selected by the user in the application modernization user interface 118. For example, the user may select and/or input a sample operational log for a business process by selecting and/or inputting a sample business process event log. The application modernization program 110 may identify the plurality of entities utilized by the model of the application in executing the sample business process event log, the interactions between each of the plurality of entities, and the energy consumption pattern of the application in executing the sample business process event logs.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
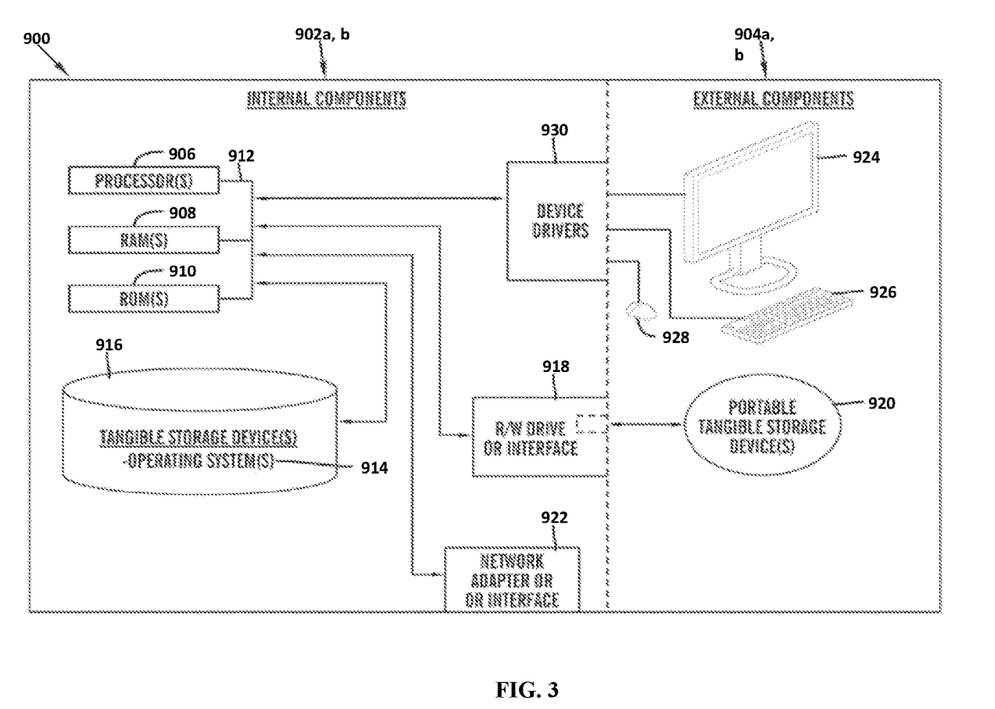
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the application modernization program 110a in client computer 102, and the application modernization program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the application modernization program 110a and 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the application modernization program 110a in client computer 102 and the application modernization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the application modernization program 110a in client computer 102 and the application modernization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
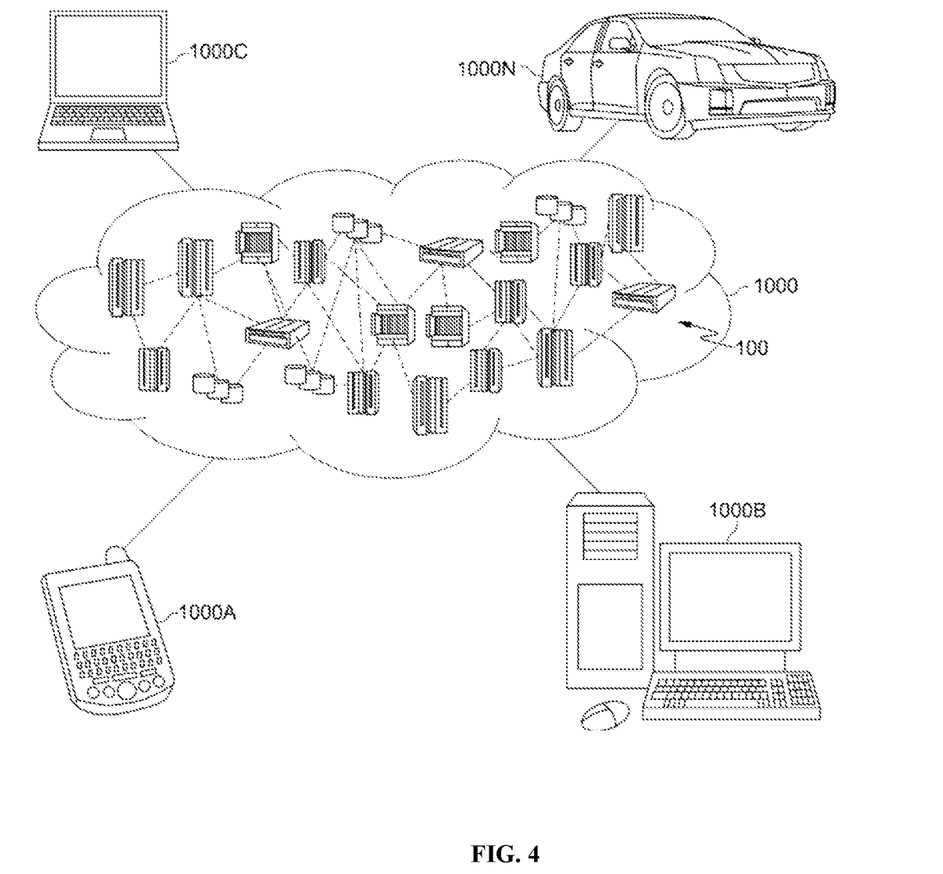
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
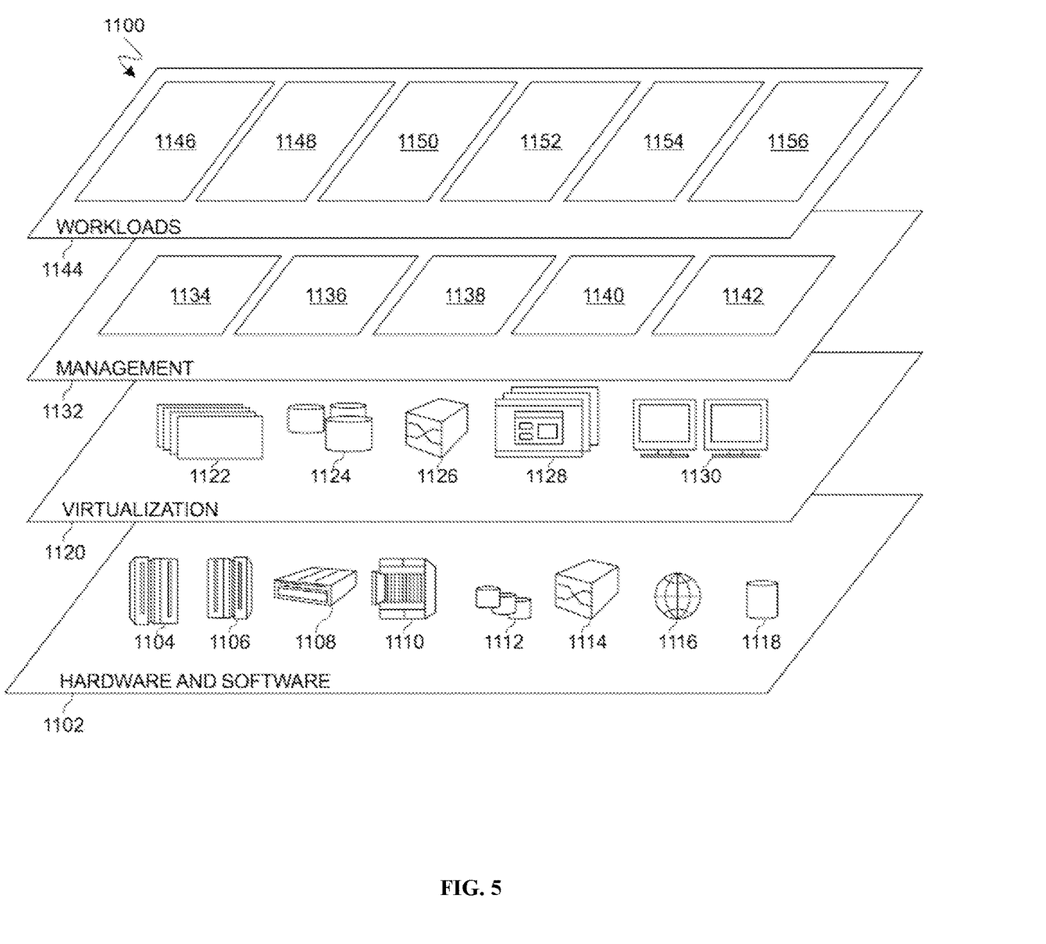
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the application modernization program 1156. An application modernization program 110a, 110b provides a way to discover and analyze application components to be modernized and/or reduce energy consumption.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for application modernization, the method comprising:
   receiving operational data related to an application, wherein the operational data includes at least one or more operational logs related to an execution of one or more processes;
   constructing a key-value set comprised of a plurality of entities, wherein the plurality of entities comprising the key-value set exceed a predetermined threshold for a number of requests corresponding to a unique identifier identified within the operational data;
   identifying a relationship between an entity and each other entity of the key-value set by data profiling each of the plurality of entities according to at least, one or more of, correlation, composition, aggregation, and dependency between each of the plurality of entities within the one or more operational logs;
   analyzing energy consumption patterns for each workload corresponding to the execution of the one or more processes by the application, wherein the energy consumption patterns include at least, component consumption, chronological consumption, and geographical consumption;
   performing one or more modifications to the one or more processes, wherein the one or more modifications are designed to increase energy efficiency of the one or more processes based on a simulation of a plurality of sample operational logs selected by a user in an application modernization user interface, wherein at least one of the one or more modifications includes a reallocation of resources for at least one workload to a core data center or one or more edge nodes based on the geographical consumption;

monitoring the energy consumption patterns for each workload corresponding to the execution of the one or more processes by the application following an implementation of the one or more modifications and displaying one or more hotspots of energy consumption to the user in the application modernization user interface, wherein the one or more hotspots of energy consumption are displayed in real time based on a comparison with the energy consumption patterns stored in a knowledge corpus; and storing one or more energy efficiency improvement metrics in the knowledge corpus, wherein the one or more energy improvement metrics are utilized in recommending additional modifications to the one or more processes.

2. The method of claim 1, wherein the operation data related to the application is received in real time.

3. The method of claim 1, wherein the key-value set is constructed by parsing unstructured data from the operation data into attributes and key-value pairs.

4. A computer system for application modernization, comprising:

one or more processors, one or more computer-readable memories, one or more computer-readable tangible storage medium, and program instructions stored on at least one of the one or more computer-readable tangible storage medium for execution by at least one of the one or more processors via at least one of the one or more memories, wherein the computer system is capable of performing a method comprising:

receiving operational data related to an application, wherein the operational data includes at least one or more operational logs related to an execution of one or more processes;

constructing a key-value set comprised of a plurality of entities, wherein the plurality of entities comprising the key-value set exceed a predetermined threshold for a number of requests corresponding to a unique identifier identified within the operational data;

identifying a relationship between an entity and each other entity of the key-value set by data profiling each of the plurality of entities according to at least, one or more of, correlation, composition, aggregation, and dependency between each of the plurality of entities within the one or more operational logs;

analyzing energy consumption patterns for each workload corresponding to the execution of the one or more processes by the application, wherein the energy consumption patterns include at least, component consumption, chronological consumption, and geographical consumption;

performing one or more modifications to the one or more processes, wherein the one or more modifications are designed to increase energy efficiency of the one or more processes based on a simulation of a plurality of sample operational logs selected by a user in an application modernization user interface, wherein at least one of the one or more modifications includes a reallocation of resources for at least one workload to a core data center or one or more edge nodes based on the geographical consumption;

monitoring the energy consumption patterns for each workload corresponding to the execution of the one or more processes by the application following an implementation of the one or more modifications and displaying one or more hotspots of energy consumption to the user in the application modernization user interface, wherein the one or more hotspots of energy consumption are displayed in real time based on a comparison with the energy consumption patterns stored in a knowledge corpus; and storing one or more energy efficiency improvement metrics in the knowledge corpus, wherein the one or more energy improvement metrics are utilized in recommending additional modifications to the one or more processes.

5. The computer system of claim 4, wherein the operation data related to the application is received in real time.

6. The computer system of claim 4, wherein the key-value set is constructed by parsing unstructured data from the operation data into attributes and key-value pairs.

7. A computer program product for application modernization, comprising:

one or more computer readable storage media, and program instructions collectively stored on the one or more computer readable storage media, the program instructions comprising:

receiving operational data related to an application, wherein the operational data includes at least one or more operational logs related to an execution of one or more processes;

constructing a key-value set comprised of a plurality of entities, wherein the plurality of entities comprising the key-value set exceed a predetermined threshold for a number of requests corresponding to a unique identifier identified within the operational data;

identifying a relationship between an entity and each other entity of the key-value set by data profiling each of the plurality of entities according to at least, one or more of, correlation, composition, aggregation, and dependency between each of the plurality of entities within the one or more operational logs;

analyzing energy consumption patterns for each workload corresponding to the execution of the one or more processes by the application, wherein the energy consumption patterns include at least, component consumption, chronological consumption, and geographical consumption;

performing one or more modifications to the one or more processes, wherein the one or more modifications are designed to increase energy efficiency of the one or more processes based on a simulation of a plurality of sample operational logs selected by a user in an application modernization user interface, wherein at least one of the one or more modifications includes a reallocation of resources for at least one workload to a core data center or one or more edge nodes based on the geographical consumption;

monitoring the energy consumption patterns for each workload corresponding to the execution of the one or more processes by the application following an implementation of the one or more modifications and displaying one or more hotspots of energy consumption to the user in the application modernization user interface, wherein the one or more hotspots of energy consumption are displayed in real time based on a comparison with the energy consumption patterns stored in a knowledge corpus; and storing one or more energy efficiency improvement metrics in the knowledge corpus, wherein the one or more energy improvement metrics are utilized in recommending additional modifications to the one or more processes.

8. The computer program product of claim 7, wherein the operation data related to the application is received in real time.

9. The computer program product of claim 7, wherein the key-value set is constructed by parsing unstructured data from the operation data into attributes and key-value pairs.

10. A method for application component identification, the method comprising:
receiving operational data related to an application;
identifying a plurality of entities of the application based on the operational data;
identifying relationships between each of the plurality of entities;
generating a graph, wherein the graph includes each of the plurality of entities, wherein each of the plurality of entities are represented as nodes, and the relationships between each of the plurality of entities are represented as edges, wherein the plurality of entities include at least a plurality of application components;
displaying the graph to a user in an application modernization user interface, wherein the graph is further comprised of one or more visual representations corresponding to one or more hotspots of energy consumption of the application;
identifying one or more nodes within the graph, wherein the one or more nodes within the graph are identified based on the one or more nodes selected by the user within the application modernization user interface;
constructing one or more new graphs representing one or more subsets of the plurality of entities based on the one or more nodes selected by the user, wherein the one or more new graphs are displayed within the application modernization user interface and include one or more statistical attributes of the one or more entities corresponding to the one or more nodes selected by the user;
replacing at least one of the plurality of application components with a replacement application component, wherein the at least one of the plurality of application components is identified as energy inefficient based on at least the operational data and the one or more hotspots of energy consumption of the application;
monitoring the energy consumption of the application with the replacement application component and storing one or more energy improvement metrics in a knowledge corpus and displaying one or more new hotpots of energy consumption to the user in the application modernization user interface, wherein the one or more new hotspots of energy consumption are displayed in real time based on a comparison of the energy consumption of the application with the replacement application component and historical energy consumption patterns stored in the knowledge corpus; and
recommending at least one additional replacement application component based on the one or more energy improvement metrics stored in the knowledge corpus and the one or more new hotspots of energy consumption.

11. The method of claim 10, further comprising:
constructing a model of the application, wherein the model of the application is constructed based on one or more patterns within the graph identified using one or more pattern mining algorithms; and
simulating energy consumption patterns for one or more sample operational logs selected by the user within the application modernization user interface, wherein the energy consumption patterns for the one or more sample operational logs are determined based on descriptions of each of the one or more entities, interactions or dependencies between each of the one or more entities, and behavioral characteristics for each of the one or more entities within the model.

12. A computer system for application component identification, comprising:
one or more processors, one or more computer-readable memories, one or more computer-readable tangible storage medium, and program instructions stored on at least one of the one or more computer-readable tangible storage medium for execution by at least one of the one or more processors via at least one of the one or more memories, wherein the computer system is capable of performing a method comprising:
receiving operational data related to an application;
identifying a plurality of entities of the application based on the operational data;
identifying relationships between each of the plurality of entities;
generating a graph, wherein the graph includes each of the plurality of entities, wherein each of the plurality of entities are represented as nodes, and the relationships between each of the plurality of entities are represented as edges, wherein the plurality of entities include at least a plurality of application components;
displaying the graph to a user in an application modernization user interface, wherein the graph is further comprised of one or more visual representations corresponding to one or more hotspots of energy consumption of the application;
identifying one or more nodes within the graph, wherein the one or more nodes within the graph are identified based on the one or more nodes selected by the user within the application modernization user interface;
constructing one or more new graphs representing one or more subsets of the plurality of entities based on the one or more nodes selected by the user, wherein the one or more new graphs are displayed within the application modernization user interface and include one or more statistical attributes of the one or more entities corresponding to the one or more nodes selected by the user;
replacing at least one of the plurality of application components with a replacement application component, wherein the at least one of the plurality of application components is identified as energy inefficient based on at least the operational data and the one or more hotspots of energy consumption of the application;
monitoring the energy consumption of the application with the replacement application component and storing one or more energy improvement metrics in a knowledge corpus and displaying one or more new hotpots of energy consumption to the user in the application modernization user interface, wherein the one or more new hotspots of energy consumption are displayed in real time based on a comparison of the energy consumption of the application with the replacement application component and historical energy consumption patterns stored in the knowledge corpus; and recommending at least one additional replacement application component based on the one or more energy improvement metrics stored in the knowledge corpus and the one or more new hotspots of energy consumption.

13. The method of claim 1, further comprising:

constructing a model of the application, wherein the model of the application is constructed based on one or more patterns within the graph identified using one or more pattern mining algorithms; and simulating energy consumption patterns for one or more sample operational logs selected by the user within the application modernization user interface, wherein the energy consumption patterns for the one or more sample operational logs are determined based on descriptions of each of the one or more entities, interactions or dependencies between each of the one or more entities, and behavioral characteristics for each of the one or more entities within the model.

14. The method of claim 1, further comprising:

determining a modernization scope for the application based on the energy consumption patterns corresponding to the execution of the one or more processes by the application.

15. The computer system of claim 4, further comprising:

constructing one or more energy consumption graphs based on the energy consumption patterns, wherein the one or more energy consumption graphs includes at least, one or more of, a component consumption graph, a chronological consumption graph, and a geographical consumption graph.

16. The computer system of claim 4, further comprising:

determining a modernization scope for the application based on the energy consumption patterns corresponding to the execution of the one or more processes by the application.

17. The computer program product of claim 7, further comprising:

constructing one or more energy consumption graphs based on the energy consumption patterns, wherein the one or more energy consumption graphs includes at least, one or more of, a component consumption graph, a chronological consumption graph, and a geographical consumption graph.

18. The computer program product of claim 7, further comprising:

determining a modernization scope for the application based on the energy consumption patterns corresponding to the execution of the one or more processes by the application.

19. The method of claim 1, wherein the operation data related to the application is formatted into a common format using one or more pre-processing functions, and wherein the key-value set shares the common format with the operation data.

20. The method of claim 10, wherein the one or more hotspots and the one or more new hotspots of energy consumption of the application may be based on a predetermined threshold specified by the user within a set of user preferences wherein the predetermined threshold is one or more standard deviations from a typical energy consumption pattern identified using one or more pattern mining algorithms.

21. The method of claim 10, further comprising:

integrating a plurality of determined workload patterns for the application into the graph, wherein the graph is enriched with at least time-dependent characteristics and temporal behaviors for each of the plurality of entities.

22. The computer system of claim 12, wherein the one or more hotspots and the one or more new hotspots of energy consumption of the application may be based on a predetermined threshold specified by the user within a set of user preferences wherein the predetermined threshold is one or more standard deviations from a typical energy consumption pattern identified using one or more pattern mining algorithms.

23. The computer system of claim 12, further comprising:

integrating a plurality of determined workload patterns for the application into the graph, wherein the graph is enriched with at least time-dependent characteristics and temporal behaviors for each of the plurality of entities.

* * * * *